(12) United States Patent
Park et al.

(10) Patent No.: US 12,292,530 B2
(45) Date of Patent: May 6, 2025

(54) SCAN CONVERSION APPARATUS USING GPU

(71) Applicant: DANDANSYS INC, Daejeon (KR)

(72) Inventors: Daehwan Park, Daejeon (KR); Bumsun Lee, Daejeon (KR)

(73) Assignee: DANDANSYS INC, Daejeon (KR)

( * ) Notice: Subject to any disclaimer, the term of this patent is extended or adjusted under 35 U.S.C. 154(b) by 161 days.

(21) Appl. No.: 18/170,108

(22) Filed: Feb. 16, 2023

(65) Prior Publication Data

US 2023/0194655 A1  Jun. 22, 2023

Related U.S. Application Data

(63) Continuation of application No. PCT/KR2020/016435, filed on Nov. 20, 2020.

(30) Foreign Application Priority Data

Sep. 11, 2020 (KR) .......................... 10-2020-0116591

(51) Int. Cl.
  *G01S 7/10* (2006.01)
  *G06T 1/20* (2006.01)
  *G06T 11/00* (2006.01)

(52) U.S. Cl.
  CPC ............... *G01S 7/10* (2013.01); *G06T 1/20* (2013.01); *G06T 11/001* (2013.01); *G06T 2210/36* (2013.01)

(58) Field of Classification Search
  CPC . G01S 7/10; G01S 13/89; G01S 7/298; G01S 7/04; G06T 1/20; G06T 11/001;
  (Continued)

(56) References Cited

U.S. PATENT DOCUMENTS 5,554,992 A * 9/1996 Toth .................. G01S 7/295
  342/185
5,579,456 A * 11/1996 Cosman .............. G06T 15/20
  345/419

(Continued)

FOREIGN PATENT DOCUMENTS

KR  10-2015-0042559 A  4/2015
KR  10-1827167 B1  2/2018

(Continued)

OTHER PUBLICATIONS

International Search Report mailed Jun. 7, 2021 in International Application No. PCT/KR2020/016435.

(Continued)

*Primary Examiner* — Motilewa Good-Johnson
(74) *Attorney, Agent, or Firm* — Knobbe, Martens, Olson, & Bear, LLP

(57) ABSTRACT

A scan conversion apparatus using a graphics processing unit (GPU) is proposed. The scan conversion apparatus may include an input unit that receives an input of N-th azimuth information (N is a natural number) of a radar, and a controller. The controller may check the sampling number of the inputted N-th azimuth information, and compare the checked sampling number of the N-th azimuth information with the sampling number of a preset scan conversion to determine whether to perform additional sampling. The controller may also perform additional sampling through a GPU according to a determined result, and generate a texture map by using the N-th azimuth information which is additionally sampled or not additionally sampled. The controller may further draw an N-th triangular shape on the basis of the center coordinates of a circle through the GPU, and then perform a scan conversion on the texture map by texture mapping.

6 Claims, 8 Drawing Sheets

(58) Field of Classification Search
CPC ... G06T 2210/36; G06T 7/40; G06T 2200/28; G06T 2207/10044
See application file for complete search history.

(56) References Cited

U.S. PATENT DOCUMENTS

| | | | | |
|---|---|---|---|---|
| 6,140,955 | A * | 10/2000 | Andrusiak | G01S 7/12 |
| | | | | 342/185 |
| 6,621,451 | B1 * | 9/2003 | Fisher | G06T 11/001 |
| | | | | 342/185 |
| 8,013,872 | B2 * | 9/2011 | Brunner | G06T 11/203 |
| | | | | 345/611 |
| 8,187,192 | B2 * | 5/2012 | Yao | G01S 7/52044 |
| | | | | 600/443 |
| 9,019,280 | B2 * | 4/2015 | Nordlund | G06T 11/40 |
| | | | | 345/422 |
| 11,556,745 | B2 * | 1/2023 | Hennings Yeomans | |
| | | | | G01S 13/89 |
| 2009/0121923 | A1 * | 5/2009 | Mainds | G01S 7/298 |
| | | | | 342/185 |
| 2014/0278065 | A1 * | 9/2014 | Ren | G06T 17/05 |
| | | | | 701/454 |
| 2017/0270710 | A1 * | 9/2017 | Beri | G06T 11/40 |
| 2020/0025908 | A1 | 1/2020 | Aoki et al. | |
| 2023/0236314 | A1 * | 7/2023 | Jin | G01S 7/356 |
| | | | | 342/70 |

FOREIGN PATENT DOCUMENTS

| | | |
|---|---|---|
| KR | 10-2025332 B1 | 9/2019 |
| KR | 10-2020-0056818 A | 5/2020 |

OTHER PUBLICATIONS

Notice of Allowance dated Mar. 16, 2022 in Korean Application No. 10-2020-01169591.

* cited by examiner

FIG. 8

```
DDA_SectorForm (A_idx, A_cnt, S_cnt, w, h, S_buf [S_cnt])
{

Step1: Input value of Azimuth_Index (A_idx), Azimuth_Count (A_cnt), Sample_Count
  (S_cnt), Window Resolution (w * h), sample buffer (S_buf [S_cnt])

Step2: Declare θ, R_r_s, r, dx, dy, x, y floating point variable.

Step3: Calculate variables.
        Azimuth Degree (θ) = 360 °/A_cnt
        Window Resolution radius (r) = Min (w, h) / 2
        Ratio of number of samples to radius (R_r_s) = S_cnt / r
        Loop Index (L_idx) = 1

Step4: initial sample's coordinate x_2 = 0, y_2 = 0

Step5: start sample's coordinate x_1 = x_2, y_1 = y_2

Step6: Calculate end sample's coordinate.
        x_2 = (R_r_s * L_idx) * sin(θ * A_idx)
        y_2 = (R_r_s * L_idx) * cos(θ * A_idx)
        x_2 = ROUND (x_2)
        y_2 = ROUND (y_2)

Step7: Get intensity (intensity) = S_buf [L_idx]

Step8: DDA_Samples (x1, y1, x2, y2, θ * (A_idx + 1), intensity)

Step9: L_idx = L_idx + 1

Step10:  Repeat step5 until S_cnt < L_idx

Step11: End Algorithm

```
DDA_Samples (x1, y1, x2, y2, Θ, intensity)

{

Step1: Input value of x₁, y₁, x₂, y₂, intensity

Step2: Declare dx, dy, x, y floating point variable.

Step3: Calculate slope dx = x₂-x₁

Step4: Calculate slope dy = y₂-y₁

Step5: If ABS (dx) > ABS (dy)
              step = abs (dx)
         Else
              step = abs(dy)

Step6: x_inc=dx/step
         y_inc=dy/step
         assign x = x₁
         assign y = y₁

Step7: Calculate start coordinate of next azimuth
         R = √(x² + y²)
         xₙ = R * sin(Θ)
         yₙ = R * cos(Θ)

Step8: DDA (x, y, xₙ, yₙ, intensity)

Step9: x = x + x_inc
         y = y + y_inc

Step10:  If ABS (dx) > ABS (dy)
              Repeat step7 until x = x₂
           Else
              Repeat step7 until y = y₂

Step10: End Algorithm

}
```

SCAN CONVERSION APPARATUS USING GPU

CROSS REFERENCE TO RELATED APPLICATIONS

This is a continuation application of International Patent Application No. PCT/KR2020/016435, filed on Nov. 20, 2020, which claims priority to Korean patent application No. KR 10-2020-0116591 filed on Sep. 11, 2020, contents of each of which are incorporated herein by reference in their entireties.

BACKGROUND

Technical Field

The present disclosure relates to a scan conversion technology and, more particularly, to a scan conversion apparatus using a graphics processing unit (GPU) which performs a scan conversion by down-sampling or up-sampling a radar video with the GPU and then performs texture mapping.

Description of the Related Technology

With the recent growth of computer graphics systems, it has become possible to perform image processing of radar video at high speed under software control.

SUMMARY

An object of the present disclosure is to provide a scan conversion apparatus using a GPU that reduces a CPU load by performing a scan conversion of a radar video using the GPU.

Another object of the present disclosure is to provide a scan conversion apparatus using a GPU that reduces a computation time by performing a down-sampling or up-sampling process with the GPU that performs a parallel computation.

In order to accomplish the above objects, the present disclosure provides a scan conversion apparatus using a graphics processing unit (GPU) that includes an input unit configured to receive N-th (N is a natural number) azimuth information of a radar; and a controller configured to identify a sampling number of the received N-th azimuth information, to compare the identified sampling number of the N-th azimuth information with a predetermined sampling number of a scan conversion to determine whether to perform additional sampling, to perform the additional sampling through the GPU 43 depending on a result of determination, to generate a texture map using the additionally sampled or not additionally sampled N-th azimuth information, to draw an N-th triangle based on a center coordinate of a circle through the GPU, and to perform the scan conversion by texture-mapping the texture map.

In addition, the controller may be configured to perform up-sampling if the sampling number of the N-th azimuth information is less than the sampling number of the scan conversion, to perform down-sampling if the sampling number of the N-th azimuth information is greater than the sampling number of the scan conversion, and to perform no additional sampling if the sampling number of the N-th azimuth information is equal to the sampling number of the scan conversion.

In addition, the controller may be configured to, after generating the texture map, determine whether N is changed, and if N is changed, update all the coordinates of the triangle to match the changed N.

In addition, the controller may be configured to, if N is 1, calculate coordinates of two points except a center point, and if N is 2 or more, calculate coordinate of one point only excluding the center point and a previously calculated point in case of N−1.

In addition, as N is larger, the drawn triangle is seen like a triangular shape, and as N is smaller, the drawn triangle is seen like a sector form.

The scan conversion apparatus using the GPU of the present disclosure compares the number of samplings of the N-th azimuth information with the predetermined number of samplings of the scan conversion and, if a sampling operation is required, performs a down-sampling or up-sampling process as the additional sampling through the GPU, thereby reducing the CPU load.

In addition, by performing the down-sampling or up-sampling process with the GPU that performs the parallel computation, it is possible to reduce the computation time.

BRIEF DESCRIPTION OF THE DRAWINGS

FIGS. 7 and 8 are diagrams illustrating a traditional DDA scan conversion method.

DETAILED DESCRIPTION

Figure 1:
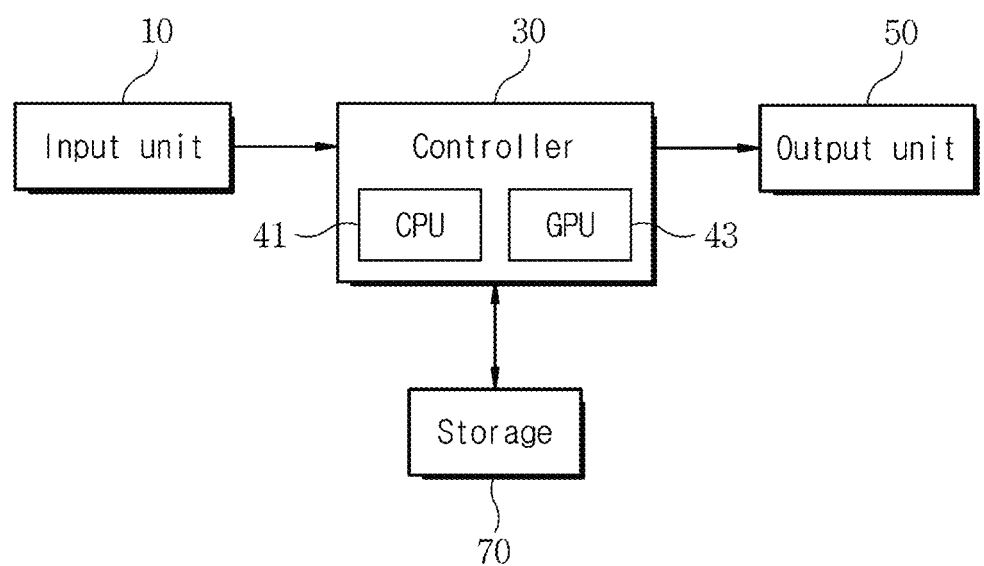
FIG. 1 is a block diagram illustrating a scan conversion apparatus according to an embodiment of the present disclosure.

Meanwhile, due to the nature of radar video, necessary processing such as the sensitizing processing of image information, the processing of painting high-luminance points with priority, or the coordinate conversion processing of corresponding to the screen pixels of image information handled in the polar coordinates from the radar position is performed in a central processing unit (CPU) by software. As a result, an overload occurs in the CPU, which affects the calculation speed of the entire system. Therefore, various researches are needed to solve these problems.

Hereinafter, an embodiment of the present disclosure will be described in detail with reference to the accompanying drawings. In assigning reference numerals to components in the drawing, the same numerals may be assigned to the same components as much as possible even though they are illustrated in different drawings. In addition, in describing the present disclosure, if it is determined that a detailed description of a related known configuration or function is obvious to those skilled in the art or may obscure the subject matter of the present disclosure, the detailed description will be omitted.

FIG. 1 is a block diagram illustrating a scan conversion apparatus according to an embodiment of the present disclosure.

Referring to FIG. 1, the scan conversion apparatus 100 performs a scan conversion on a radar video by using a GPU to reduce a CPU load. The scan conversion apparatus 100 reduces a computation time by performing a down-sampling or up-sampling process with a GPU that performs a parallel computation. Here, the scan conversion apparatus 100 may be a computer system such as a desktop computer or a laptop computer. The scan conversion apparatus 100 includes an input unit 10 and a controller 30 and may further include an output unit 50 and a storage 70.

The input unit 10 receives N-th (N is a natural number) azimuth information of the radar. The input unit 10 may sequentially receive the N-th azimuth information in the order from 1 to N. Here, the radar may generally have 512 to 16384 azimuths and samplings, and the number of azimuths may be set according to the purpose of use. For example, because one azimuth is drawn from the center coordinate of a circle, the radial resolution corresponding to one azimuth corresponds to 1080 (=2160/2) based on the UHD (3840×2160) resolution. Therefore, considering the UHD resolution, the number of samplings corresponding to one azimuth may be, but is not limited to, 1024.

Meanwhile, although not shown in the drawings, the scan conversion apparatus 100 may include a communication unit (not shown) instead of the input unit 10. The communication unit may receive azimuth information from the radar through a communication network.

The controller 30 performs the overall control of the scan conversion apparatus 100. The controller 30 may include a CPU 41 and a GPU 43, and the CPU 41 and the GPU 43 may individually perform their calculations.

In detail, the controller 30 identifies the sampling number of the N-th azimuth information from the input unit 10. That is, the controller 30 analyzes the N-th azimuth information, which is the original data inputted from the radar, and identifies the number of samplings. The controller 30 compares the identified number of samplings of the N-th azimuth information with the predetermined number of samplings of a scan conversion and thereby determines whether to perform additional sampling. That is, the controller 30 performs up-sampling if the number of samplings of the N-th azimuth information is less than the predetermined number of samplings of the scan conversion, performs down-sampling if the number of samplings of the N-th azimuth information is greater than the predetermined number of samplings of the scan conversion, and does not perform additional sampling if the number of samplings of the N-th azimuth information is equal to the number of samplings of the scan conversion. In addition, in case of performing down-sampling, a minimum value (Min), a maximum value (Max), and an average value (Average) can be selected in order to increase the visibility of the screen and the effectiveness of target identification. At this time, the controller 30 performs up-sampling and down-sampling, which are additional sampling, through the GPU 43 instead of the CPU 41. The controller 30 generates a texture map using the additionally sampled or not additionally sampled N-th azimuth information. The controller 30 draws an N-th triangle based on the center coordinates of a circle for representing the original data of the radar through the GPU 43, and then performs the scan conversion by mapping the texture map. Here, after generating the texture map, the controller 30 may determine whether N representing the number of azimuths is changed, and if N is changed, update the entire coordinates of the triangle to match the changed N.

The output unit 50 outputs radar information generated by the controller 30 that performs sampling, texture mapping, and scan conversion. The output unit 50 may output the radar information generated in real time. The output unit 50 may use HD (1280×720), FHD (1920×1080), or UHD (3840×2160) in the case of a resolution of 16:9. The output unit 50 may include at least one of a liquid crystal display (LCD), a thin film transistor-liquid crystal display (TFT LCD), an organic light-emitting diode (OLED), a flexible display, and a 3D display.

The storage 70 stores a program or algorithm for operating the scan conversion apparatus 100. In addition, the storage 70 stores azimuth information inputted from the input unit 100 and information calculated or generated by the controller 30. The storage 70 may include at least one storage medium of a flash memory type, a hard disk type, a multimedia card micro type, a card type memory (e.g., SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

Figure 2:
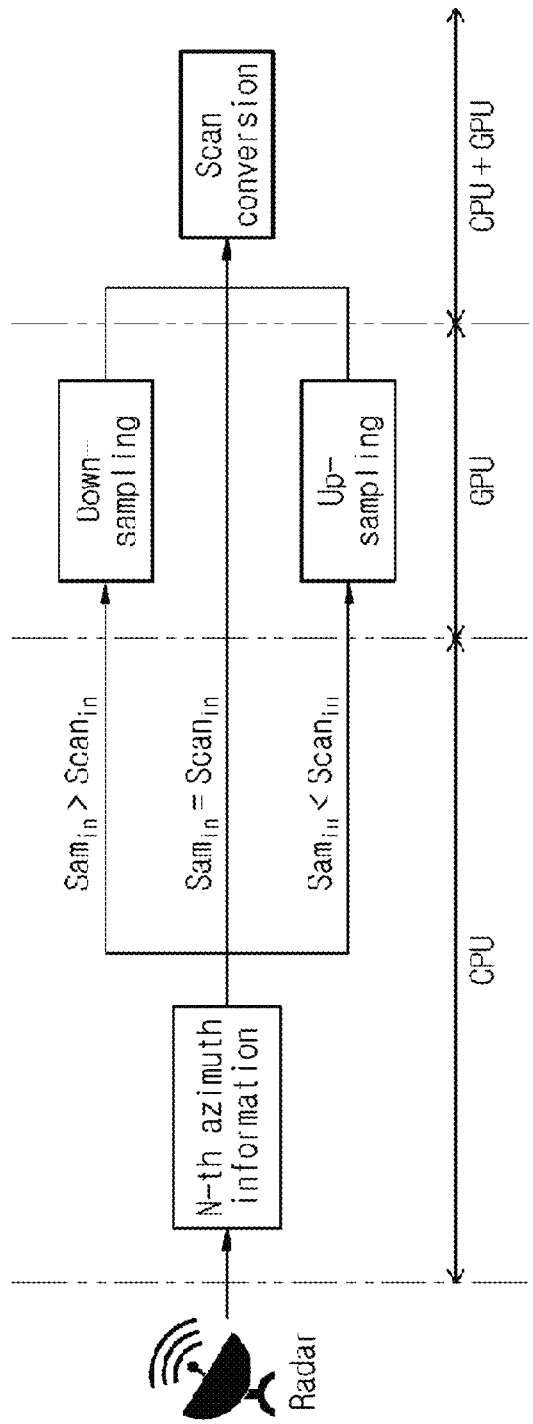
FIG. 2 is a diagram illustrating a process of scan-converting azimuth information of a radar according to an embodiment of the present disclosure.
Figure 3A:
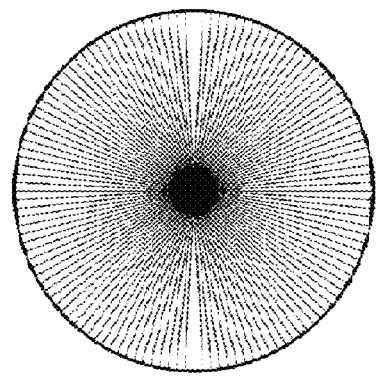
FIGS. 3A-3D are diagrams illustrating shapes of triangles depending on the number of azimuths according to an embodiment of the present disclosure.
Figure 3B:
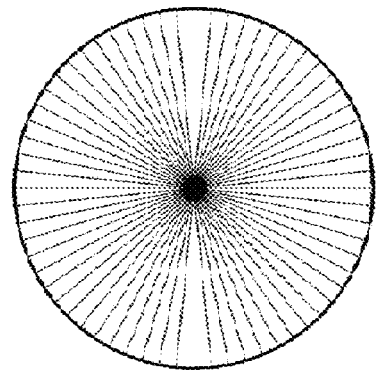
Figure 3C:
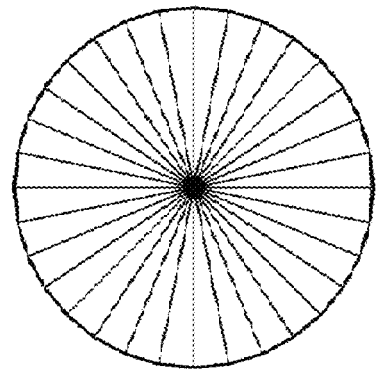
Figure 3D:
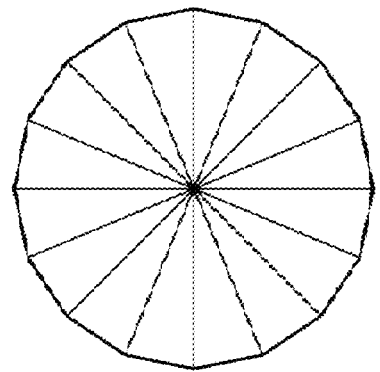
Figure 4:
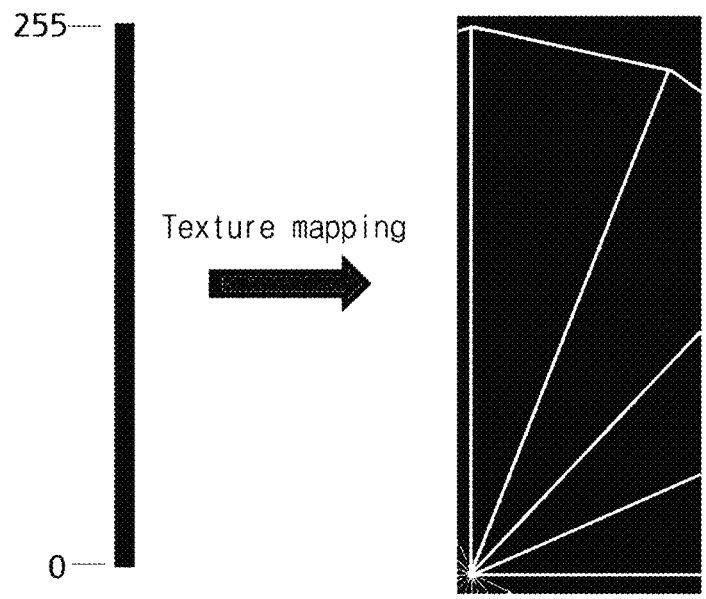
FIG. 4 is a diagram illustrating texture mapping according to an embodiment of the present disclosure.
Figure 5:
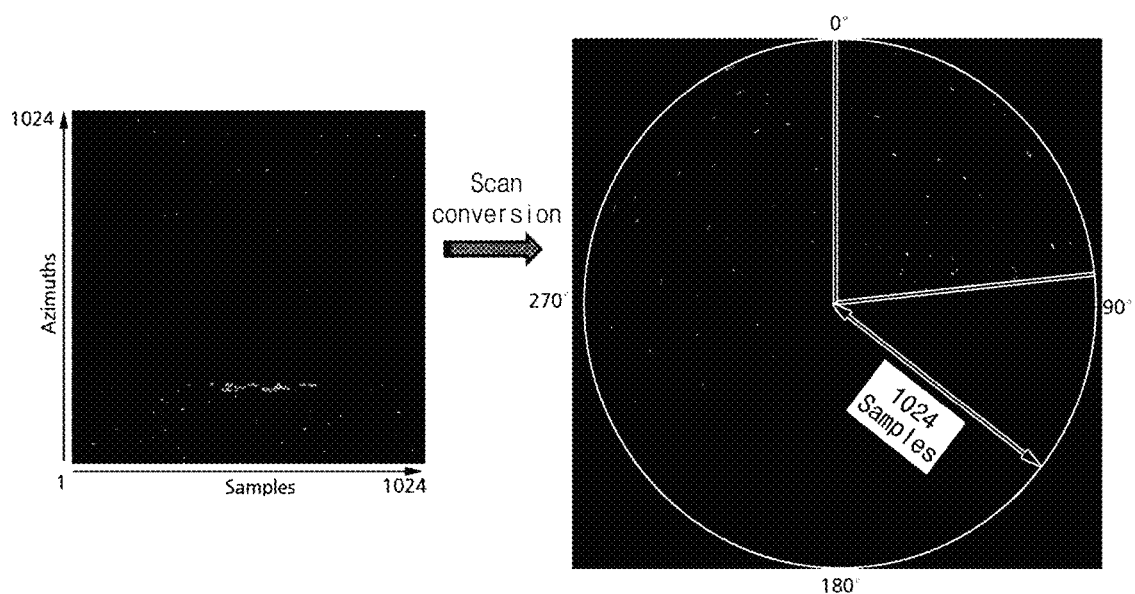
FIG. 5 is a diagram illustrating a scan conversion result according to an embodiment of the present disclosure.

FIG. 2 is a diagram illustrating a process of scan-converting azimuth information of a radar according to an embodiment of the present disclosure. FIGS. 3A-3D are diagrams illustrating shapes of triangles depending on the number of azimuths according to an embodiment of the present disclosure. FIG. 4 is a diagram illustrating texture mapping according to an embodiment of the present disclosure. FIG. 5 is a diagram illustrating a scan conversion result according to an embodiment of the present disclosure. FIG. 3A shows the shape of triangles in the case of 16 azimuths, FIG. 3B shows the shape of triangles in the case of 32 azimuths, FIG. 3C shows the shape of triangles in the case of 64 azimuths, and FIG. 3D shows the shape of triangles in the case of 128 azimuths.

Referring to FIGS. 1 to 5, the scan conversion apparatus 100 performs a calculation process of scan-converting azimuth information of a radar through at least one of the CPU 41 and the GPU 43.

The CPU 41 identifies the sampling number ($Sam_{in}$) of the N-th azimuth information inputted from the radar, compares the identified sampling number of the N-th azimuth information with the predetermined sampling number ($Scan_{in}$) of the scan conversion, and controls a calculation depending on the result of comparison.

The GPU 43 may or may not perform additional sampling depending on the result of comparison from the CPU 41. The GPU 43 performs up-sampling if the sampling number of the N-th azimuth information is less than the predetermined sampling number of the scan conversion ($Sam_{in} < Scan_{in}$), and performs down-sampling if the sampling number of the N-th azimuth information is greater than the predetermined sampling number of the scan conversion ($Sam_{in} > Scan_{in}$). In addition, the GPU 43 does not perform up-sampling and down-sampling, which are additional samplings, when the sampling number of the N-th azimuth information is equal to the sampling number of the scan conversion ($Sam_{in} = Scan_{in}$). The GPU 43 may perform up-sampling or down-sampling with an appropriate size considering the resolution.

The CPU 41 generates a texture map using the additionally sampled or not additionally sampled N-th azimuth information. For example, when the N-th azimuth consists of 256 samples, the CPU 41 may generate the texture map by setting straight lines composed of pre-stored 256 points as a texture. At this time, the 256 points are assigned numbers from 0 to 255 and can be set to have a value that gradually becomes brighter as the number goes from 0 to 255.

The GPU 43 draws a triangular shape according to N, which is the number of azimuths, and performs a scan conversion by mapping a texture map. In detail, the GPU 43 draws the N-th triangle based on the center coordinate (0,0) of the circle. If N is 1, the GPU 43 can draw a triangle connecting three points by calculating coordinates of two points except a center point, and if N is 2 or more, the GPU 43 can draw a triangle by calculating a coordinate of one point only excluding the center point and a previously calculated point in the case of N−1. At this time, as N is larger, the drawn triangle is seen like a triangular shape, and as N is smaller, the drawn triangle is seen like a sector form. The GPU 43 performs the scan conversion by texture-mapping the texture map generated by the CPU 41 on the drawn triangle.

Figure 6:
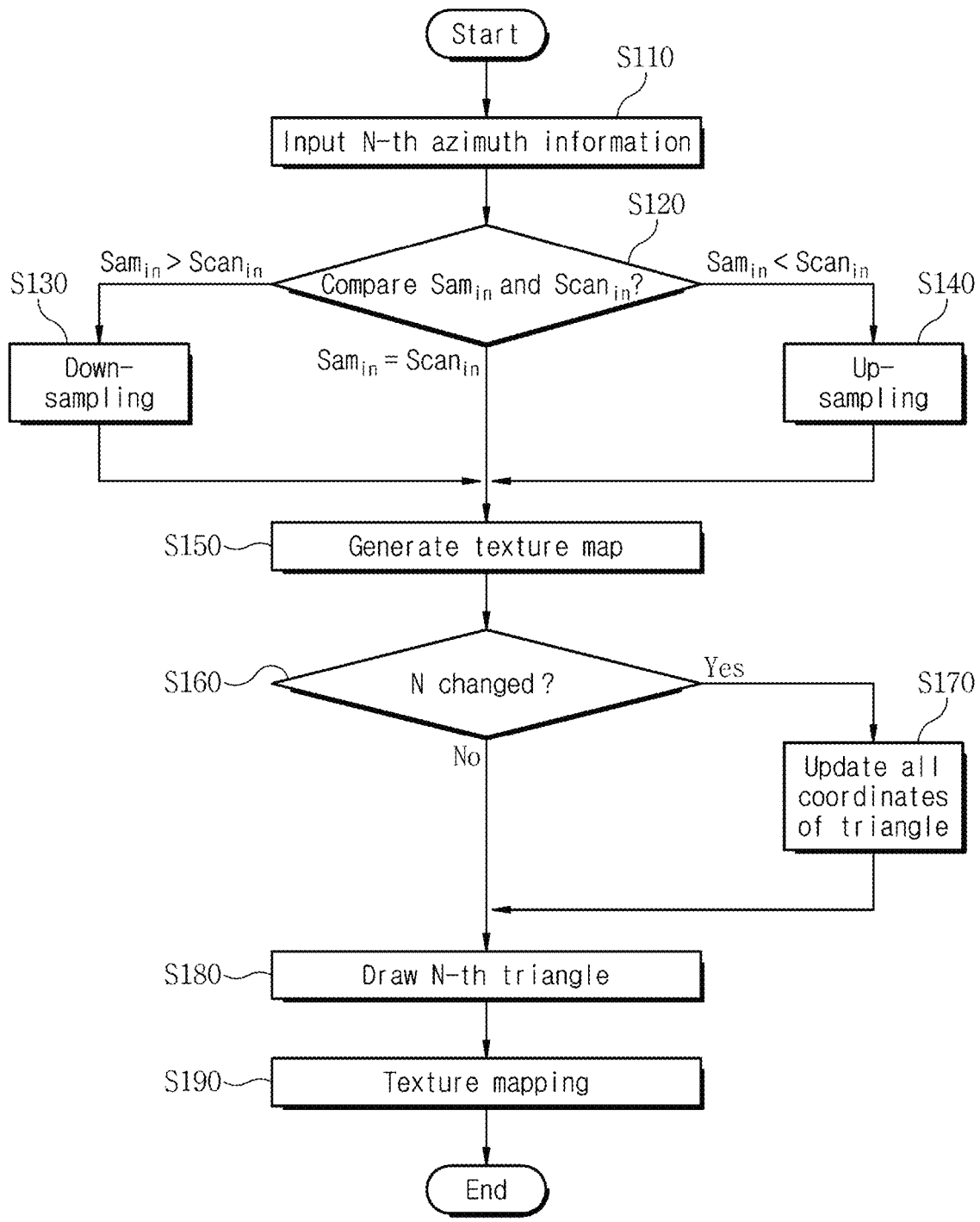
FIG. 6 is a flowchart illustrating a scan conversion method according to an embodiment of the present disclosure.

FIG. 6 is a flowchart illustrating a scan conversion method according to an embodiment of the present disclosure.

Referring to FIGS. 1 and 6, the scan conversion method includes comparing the number of samplings of the N-th azimuth information with the predetermined number of samplings of the scan conversion and, if additional sampling is required, performing a down-sampling or up-sampling process as the additional sampling through the GPU 43, thereby reducing the load of the CPU 41. By performing the down-sampling or up-sampling process with the GPU 43 that performs the parallel computation, the scan conversion method can reduce the computation time.

At step S110, the input unit 10 receives N-th azimuth information. The input unit 10 may sequentially receive the N-th azimuth information in the order from 1 to N.

At step S120, the CPU 41 identifies the number of samplings of the N-th azimuth information and compares the identified sampling number of the N-th azimuth information with the predetermined number of samplings of a scan conversion. The CPU 41 controls to perform step S130 when the number of samplings of the N-th azimuth information is greater than the predetermined number of samplings of the scan conversion ($Sam_{in} > Scan_{in}$), controls to perform step S140 when the number of samplings of the N-th azimuth information is less than the number of samplings of the scan conversion ($Sam_{in} < Scan_{in}$), and controls to perform step S150 when the number of samplings of the N-th azimuth information is equal to the number of samplings of the scan conversion ($Sam_{in} = Scan_{in}$).

At step S130, the GPU 43 performs down-sampling of the N-th azimuth information. The GPU 43 performs down-sampling with an appropriate size in consideration of the resolution.

At step S140, the GPU 43 performs up-sampling of the N-th azimuth information. The GPU 43 performs up-sampling with an appropriate size in consideration of the resolution.

At step S150, the CPU 41 generates a texture map. For example, when the N-th azimuth consists of 256 samples, the CPU 41 may generate the texture map by setting straight lines composed of 256 pre-stored points as a texture.

At step S160, the CPU 41 determines whether N representing the number of azimuths is changed. The CPU 41 controls to perform step S170 when N is changed, and controls to perform step S180 when N is not changed.

At step S170, the CPU 41 updates all the coordinates of a triangle. The CPU 41 entirely updates the coordinates of the existing triangle to match the changed N.

At step S180, the GPU 43 draws the N-th triangle. The GPU 43 draws the N-th triangle according to N, which is the number of azimuths. At this time, if N is 1, the GPU 43 can draw a triangle connecting three points by calculating coordinates of two points except a center point, and if N is 2 or more, the GPU 43 can draw a triangle by calculating a coordinate of one point only excluding the center point and a previously calculated point in the case of N−1.

At step S190, the GPU 43 performs a scan conversion through texture mapping. The GPU 43 performs the scan conversion by texture-mapping the texture map generated by the CPU 41 on the drawn triangle.

Hereinafter, for the scan conversion method according to the present disclosure and the DDA scan conversion according to a traditional scan conversion method shown in FIGS. 7 and 8, calculation amounts are compared.

Comparative Example 1: Amount of Calculation for the First Azimuth

Comparative Example 1 was performed under the conditions that the number of azimuths is 16, the number of samples is 16, and the window resolution is 64×64.

TABLE 1

| Type | Number of coordinate calculations | Number of pixel substitution calculations | Note |
|---|---|---|---|
| Invention | 2 | 32 | |
| DDA | 96 | 201 | |

Figure 7:
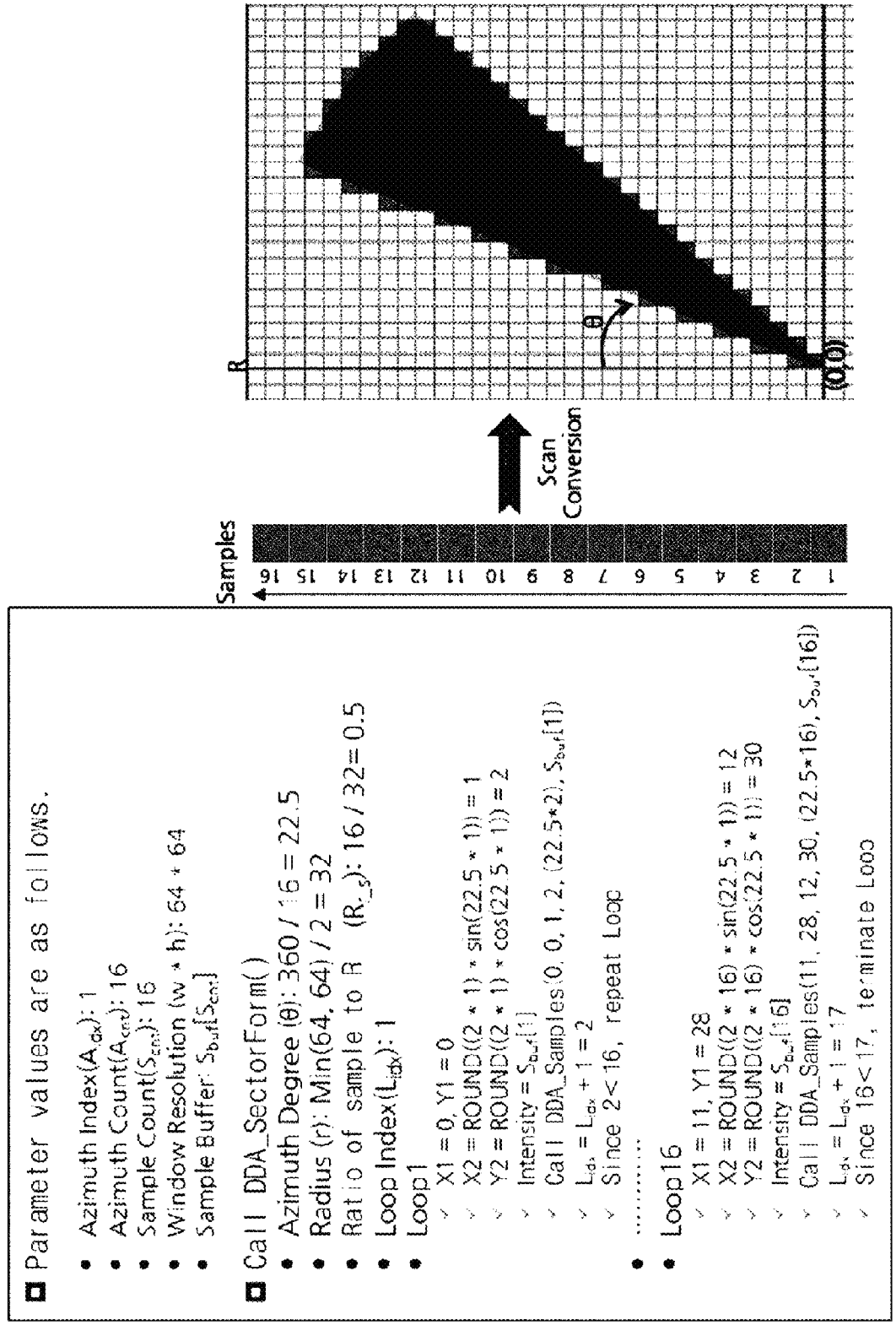

Referring to FIGS. 7 and 8 and Table 1, in case of the present disclosure, only the coordinates other than the center coordinate of the circle need to be calculated in the coordinate calculations, so the coordinate calculations are completed with two operations. However, the DDA performs 32 operations by repeating 2 coordinate calculations 16 times through DDA_SectorForm( ) and performs 64 operations (=16×2×2) by repeating 2 coordinate calculations twice per repetition of DDA_SectorForm( ) through DDA_Samples( ), thus performing a total of 96 operations (=32+64). Also, in the pixel substitution calculations, the present disclosure performs 32 operations by converting 16 samples into 32 samples through down-sampling. However, the DDA performs about 201 operations by dividing the area of the circle (about 3217) by 16 azimuths.

Comparative Example 2: Amount of Calculation for all Azimuths

Comparative Example 2 was performed under the conditions that the number of azimuths is 16, the number of samples is 16, and the window resolution is 64×64.

TABLE 2

| Type | Number of coordinate calculations | Number of pixel substitution calculations | Note |
|---|---|---|---|
| Invention | 17 | 512 | |
| DDA | 1536 | 3217 | |

Referring to FIGS. 7 and 8 and Table 2, in case of the present disclosure, in the first coordinate calculation, only the coordinates other than the center coordinate of the circle need to be calculated, so two operations are performed, and in each of the second to 16th coordinate calculations, only one operation is required, so total 17 operations (=2+15) are performed. However, the DDA performs 32 operations for one azimuth by repeating 2 coordinate calculations 16 times through DDA_SectorForm( ) and performs 64 operations (=16×2×2) by repeating 2 coordinate calculations twice per repetition of DDA_SectorForm( ) through DDA_Samples( ), thus performing a total of 96 operations (=32+64). By repeating these operations 16 times, a total of 1536 operations (=96×16) are performed.

Also, in the pixel substitution calculations, the present disclosure performs 32 operations by converting 16 samples into 32 samples through down-sampling and repeats these operations 16 times, thus performing a total of 512 operations. However, the DDA performs calculations as much as the area of a circle (about 3217), thus performing a total of 3217 operations.

Therefore, the present disclosure can have the effect of reducing the calculation time by reducing the amount of calculation, compared to the DDA as in the Comparative Examples 1 and 2.

The method according to an embodiment of the present disclosure may be provided in the form of a non-transitory computer-readable recording medium suitable for storing computer program instructions and data. The computer-readable recording medium may include program instructions, data files, data structures, etc. alone or in combination, and includes all kinds of recording devices in which data that can be read by a computer system is stored. The computer-readable recording medium includes a hardware device specially configured to store and execute program instructions, including magnetic media such as a hard disk, a floppy disk, and a magnetic tape, optical media such as a compact disc read only memory (CD-ROM) and a digital versatile disc (DVD), magneto-optical media such as a floptical disk, and semiconductor memories such as a read only memory (ROM), a random access memory (RAM), and a flash memory. Further, the computer-readable recording medium may be distributed over networked computer systems so that computer-readable code can be stored and executed in a distributed fashion. In addition, functional programs, associated codes, and code segments for implementing the present disclosure easily deduced or altered by programmers in the art to which the present disclosure belongs.

Although embodiments of the present disclosure are described above, these embodiments are exemplary only and not construed as a limitation. Various changes and modifications to the present disclosure and their equivalents can be made as well understood by those skilled in the art without departing from the technical subject matter of the present disclosure and the scope of appended claims.

What is claimed is:

1. A scan conversion apparatus using a graphics processing unit (GPU), comprising:
an input unit configured to receive N-th azimuth information of a radar sampled with a sampling number, wherein N is a natural number; and
a controller comprising a central processing unit (CPU) and the GPU and configured to:
identify, using the CPU, the sampling number of the received N-th azimuth information;
compare, using the CPU, the identified sampling number of the received N-th azimuth information with a predetermined sampling number of a scan conversion;
in response to determination that the identified sampling number is different from the predetermined sampling number, perform, using the GPU, the additional sampling on the received N-th azimuth information;
generate, using the CPU, a texture map based on the additionally sampled N-th azimuth information;
generate, using the GPU, an N-th triangle based on a center coordinate of a circle; and
perform, using the GPU, the scan conversion by texture-mapping the texture map.

2. The scan conversion apparatus of claim 1, wherein the controller is configured to perform the additional sampling by:
up-sampling on the received N-th azimuth information in response to the sampling number of the N-th azimuth information being less than the sampling number of the scan conversion; or
down-sampling on the received N-th azimuth information in response to the sampling number of the N-th azimuth information being greater than the sampling number of the scan conversion.

3. The scan conversion apparatus of claim 1, wherein the controller is configured to, using the CPU:
after generating the texture map, determine whether N is changed, and
in response to determining that N is changed, update all the coordinates of the triangle to match the changed N.

4. The scan conversion apparatus of claim 1, wherein the controller is configured to, using the CPU:
in response to determining that N is 1, calculate coordinates of two points except a center point; or
in response to determining that N is 2 or greater, calculate a coordinate of one point only excluding the center point and a previously calculated point in case of N−1.

5. The scan conversion apparatus of claim 1, wherein the controller is further configured to, using the CPU:
in response to determination that the identified sampling number is the same as the predetermined sampling number, generate a texture map using the received N-th azimuth information without additional sampling on the received N-th azimuth information.

6. The scan conversion apparatus of claim 1, wherein the additionally sampled N-th azimuth information comprises K samples, wherein K is 2 or greater, and wherein the controller is further configured to generate, using the CPU, the texture map by setting straight lines composed of N pre-stored points as a texture.

* * * * *